(12) United States Patent
Fasen

(10) Patent No.: US 8,670,200 B2
(45) Date of Patent: Mar. 11, 2014

(54) SERVO PATTERN READ-BACK SIGNAL PROCESSING FOR STORAGE DEVICES

(75) Inventor: Donald J Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 80 days.

(21) Appl. No.: 13/403,119

(22) Filed: Feb. 23, 2012

(65) Prior Publication Data

US 2013/0222938 A1     Aug. 29, 2013

(51) Int. Cl.
*G11B 20/10*     (2006.01)

(52) U.S. Cl.
USPC .......................................................... 360/39

(58) Field of Classification Search
USPC .................. 369/47.1, 124.1, 124.05, 124.13, 369/124.15; 360/39, 65, 51, 75, 77.07, 55, 360/77.01, 77.05
See application file for complete search history.

(56) References Cited

U.S. PATENT DOCUMENTS

| | | | | |
|---|---|---|---|---|
| 6,016,463 | A * | 1/2000 | Ng | 702/69 |
| 6,191,906 | B1 * | 2/2001 | Buch | 360/51 |
| 7,885,202 | B2 | 2/2011 | Li et al. | |
| 7,898,760 | B2 | 3/2011 | Biskeborn | |
| 2007/0195444 | A1 * | 8/2007 | Annampedu | 360/39 |
| 2011/0032632 | A1 | 2/2011 | Erden | |

FOREIGN PATENT DOCUMENTS

| | | |
|---|---|---|
| JP | 2003141831 | 5/2003 |
| JP | 2008210006 | 9/2008 |

OTHER PUBLICATIONS

Olcer, S. et al.; Cancellation of MR Head Asymmetry in Magnetic Tape Storage Systems; http://ieeexplore.ieee.org/Xplore/login.jsp?url=http%3A%2F%2Fieeexplore.ieee.org%2Fiel5%2F4150629%2F4150630%2F04150791.pdf%3Farnumber%3D4150791&authDecision=203 > On pp. 1-6; Nov. 27, 2006.

* cited by examiner

*Primary Examiner* — Nabil Hindi
(74) *Attorney, Agent, or Firm* — Robert M. Brush

(57) ABSTRACT

Servo pattern read-back signal processing for storage devices is described. In an example, a method of processing a read-back signal derived from a servo pattern on a storage medium in a storage device includes differentiating the read-back signal in an analog domain to produce a differentiated signal; and converting the differentiated signal into digital samples.

12 Claims, 5 Drawing Sheets

SERVO PATTERN READ-BACK SIGNAL PROCESSING FOR STORAGE DEVICES

BACKGROUND

Magnetic storage devices are often included in computer systems to provide high-capacity secondary storage or data archival. Magnetic storage includes magnetic tape systems, hard disk drives, and the like. Magnetic storage generally comprises a recording medium and an access device. The access device includes a head assembly having write elements that generate magnetic fields to encode data onto the recording medium, and read elements that sense magnetic fields of the recoding medium to read data. The head assembly can also include elements for reading servo pattern(s) written to the recording medium during manufacture. The head assembly is aligned with the recording medium by sensing and following the servo pattern(s).

In particular, the head assembly senses the servo pattern(s) to produce a servo signal(s), referred to as a "read-back signal(s)." The read-back signal(s) can be digitized and processed to derive position information for aligning the head assembly to the recording medium. The magneto-resistive element used to sense the servo pattern(s) is sensitive to temperature changes and thermal transients. Such temperature changes can be caused, for example, by a particle on the recording medium, which impacts the head and causes a heating/cooling cycle. Such temperature/thermal effects can add a large baseline disturbance to the servo pattern read-back signal(s) (e.g., large amplitude, low frequency noise components).

BRIEF DESCRIPTION OF THE DRAWINGS

Some embodiments of the invention are described with respect to the following figures.

DETAILED DESCRIPTION

Servo pattern read-back signal processing for storage devices is described. In an embodiment, a read-back signal derived from a servo pattern on a storage medium is differentiated in the analog domain to produce a differentiated signal. The differentiated signal is converted into digital samples for processing in the digital domain. In an embodiment, digital domain processing includes accumulating the digital samples to re-construct the read-back signal. The digital samples are also processed to detect zero-crossings of the differentiated signal, which should correspond with amplitude peaks of the read-back signal. The re-constructed read-back signal can be used to qualify the zero-crossings to remove those not associated with amplitude peaks in the read-back signal. Time-stamps can be identified for each of the qualified zero-crossings. The time-stamps can be demodulated to derive position information for a servo reader of the storage device relative to the servo pattern. This and other embodiments can be understood with reference to example implementations described herein.

The servo pattern read-back signal processing described herein can be used in magnetic tape systems, such as linear tape systems compliant with the Linear Tape Open (LTO) standard. To meet increasing transfer rate requirements, the number of data channels has increased across LTO generations. These higher channel counts have pushed more of the signal processing into the digital domain and, as a result, moved analog-to-digital conversion to earlier in the signal processing chain. Moving analog-to-digital conversion to earlier in the chain reduces the silicon area required for the large number of channels being processed. Since there can be large amplitude, low frequency noise components in the read-back signal(s) from the servo pattern(s) on the tape, the dynamic range of the read-back signal(s) can be large.

In accordance with example implementations, the read-back signal(s) is/are differentiated in the analog domain. This can reduce signal swing at the analog-to-digital converter (ADC), mitigating signal over-range. Signal over-range at the ADC can result in reduce resolution of the sampled read-back signal(s). The analog differentiation before ADC provides a pre-conditioning tailored for the signal characteristics of the servo pattern read-back signal(s) and the processor required for timing-based signal demodulation. While example implementations may be described in terms of application to magnetic tape systems, it is to be understood that such example implementations are applicable to a wide variety of storage systems using media comprising a servo pattern.

Figure 1:
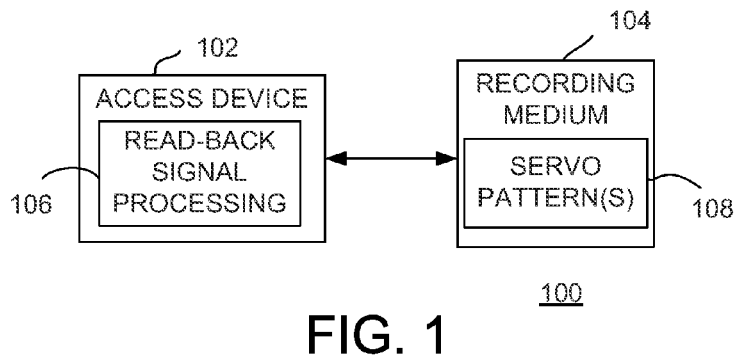
FIG. 1 is a block diagram depicting a storage system according to an example implementation.

FIG. 1 is a block diagram depicting a storage system 100 according to an example implementation. The storage system 100 includes an access device 102 and a recording medium 104 (also referred to as a "storage medium"). The recording medium 104 includes at least one servo pattern ("servo pattern(s) 108"). For example, the recording medium can be magnetic tape having one or more servo patterns. The access device 102 includes a read-back signal processing circuit 106. The read-back signal processing circuit 106 senses and processes read-back signal(s) derived from the servo pattern(s) 108. The read-back signal processing circuit 106 demodulates the read-back signals to obtain position information that can be used to align a head assembly of the access device 102 (shown in FIG. 2) with the recording medium 104.

Figure 2:
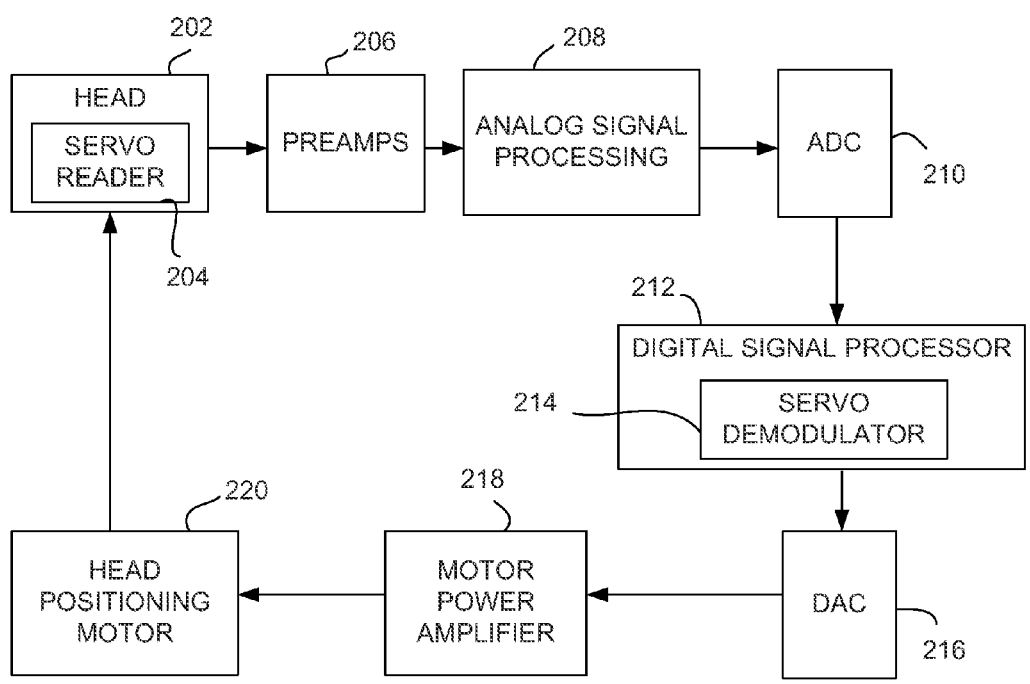
FIG. 2 is a block diagram depicting a head alignment system for a storage device according to an example implementation.

FIG. 2 is a block diagram depicting a head alignment system 200 for a storage device according to an example implementation. The head alignment system 200 includes a head 202, a servo reader 204, a preamplifier circuit ("preamps 206"), an analog signal processing circuit 208, an analog-to-digital converter (ADC) 210, a digital signal processors (DSP) 212, a digital-to-analog converter (DAC) 216, a motor power amplifier 218, and a head positioning motor 220. The head 202 traverses a storage medium, such as magnetic tape. The servo reader 204 senses magnetic servo pattern(s) and produces read-back signal(s). The preamps 206 amplify the read-back signals produced by the servo reader 204. The analog signal processing circuit 208 pre-conditions the read-back signals for digital conversion. As discussed below, the analog signal processing circuit 208 filters the read-back signal(s) in the analog domain to reduce the low frequency components of noise, thereby reducing dynamic range and allowing the limited number of levels of the ADC 210 to be used more effectively.

The ADC 210 converts the pre-conditioned read-back signals into digital samples for processing in the digital domain. The range, number of levels, and sampling rate of the ADC 210 can be set based on the signal characteristics of the pre-conditioned read-back signals (e.g., amplitude and frequency). The DSP 212 processes the digital samples of the pre-conditioned read-back signals in the digital domain. In particular, the DSP 212 includes a servo demodulator function 214 that derives position information from the pre-conditioned read-back signals. The DSP 212 may perform other functions, such as mitigation of "written-in noise" in the servo patterns. The DSP 212 can be implemented as a processor, such as a general/special purpose digital signal processor circuit, a microcontroller, or microprocessor and associated software programming, or other circuitry adapted to perform the computations described herein or their equivalents.

The DSP 212 uses the position information from the read-back signal(s) to produce a motor control signal, which is converted to an analog motor control signal by the DAC 216. The motor power amplifier 218 amplifies the power of the motor control signal. The head positioning motor 220 uses the amplified motor control signal to adjust the position of the head 202 relative to the storage medium.

Figure 3:
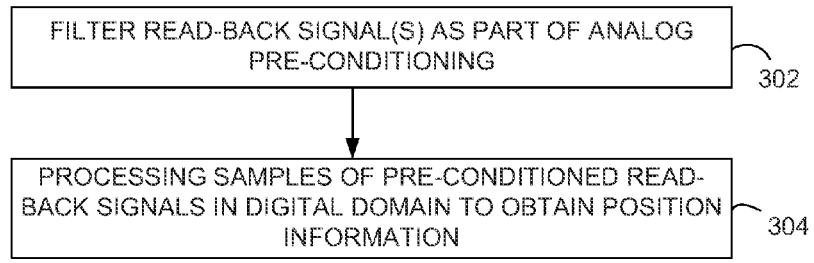
FIG. 3 is a flow diagram depicting a method of obtaining position information from servo pattern read-back signal(s) according to an example implementation.

FIG. 3 is a flow diagram depicting a method 300 of obtaining position information from servo pattern read-back signal(s) according to an example implementation. The method 300 begins at step 302, where the read-back signal(s) are filtered as part of analog pre-conditioning to reduce low-frequency noise components. Examples of analog pre-conditioning are discussed below. At step 304, digital samples of the pre-conditioned read-back signals are processed to obtain position information. In particular, a read-back signal derived from a servo pattern includes a carrier signal with amplitude peaks. Position information of the servo reader relative to the storage medium is encoded in the time-differences between the amplitude peaks of the carrier. By determining time-stamps for the amplitude peaks of the read-back signal(s), the position information can be decoded.

Figure 4:
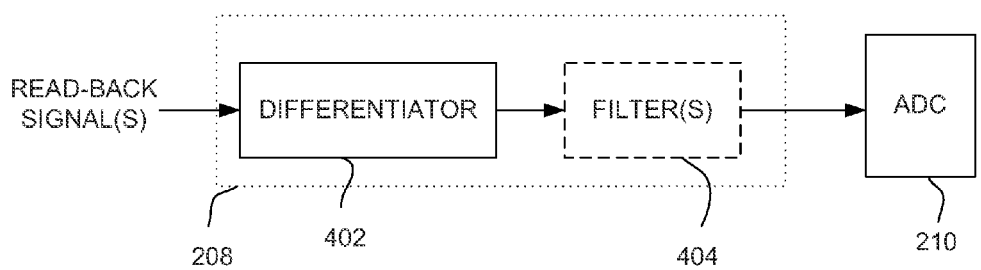
FIG. 4 is a block diagram depicting the analog signal processing circuit according to an example implementation.

FIG. 4 is a block diagram depicting the analog signal processing circuit 208 according to an example implementation. In an example, the analog signal processing circuit 208 can include a differentiator 402 coupled to the ADC 210. The differentiator 402 receives the analog read-back signals as input. The differentiator 402 performs a differentiation operation on the read-back signal(s) to provide differentiated read-back signal(s) as output. The ADC 210 converts the differentiated read-back signal(s) into digital samples. In an example, the analog signal processing circuit 208 can include one or more additional filters 404. The additional filter(s) 404 can include, for example, an anti-aliasing filter to restrict the bandwidth of the differentiated read-back signal(s) to satisfy the Nyquist-Shannon sampling theorem.

Figure 5:
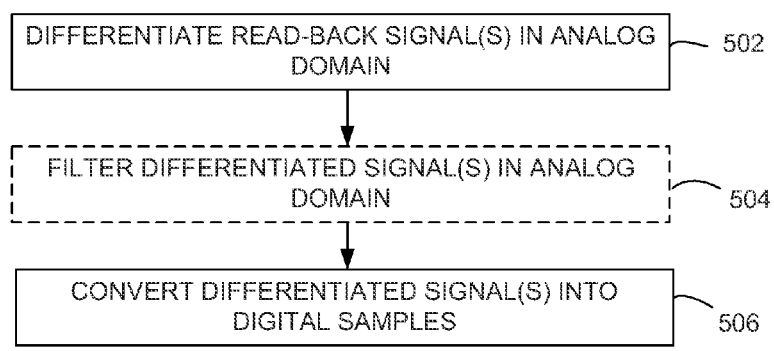
FIG. 5 is a flow diagram depicting a method of pre-conditioning servo pattern read-back signal(s) according to an example implementation.

FIG. 5 is a flow diagram depicting a method 500 of pre-conditioning servo pattern read-back signal(s) according to an example implementation. In an example, the method 500 begins at step 502, where the read-back signal(s) are differentiated in the analog domain. At step 506, the differentiated signal(s) are converted into digital samples. In an example, the method 500 proceeds from step 502 to step 504, where the differentiated signals are filtered in the analog domain using one or more additional filters, such as an anti-aliasing filter.

Figure 6:
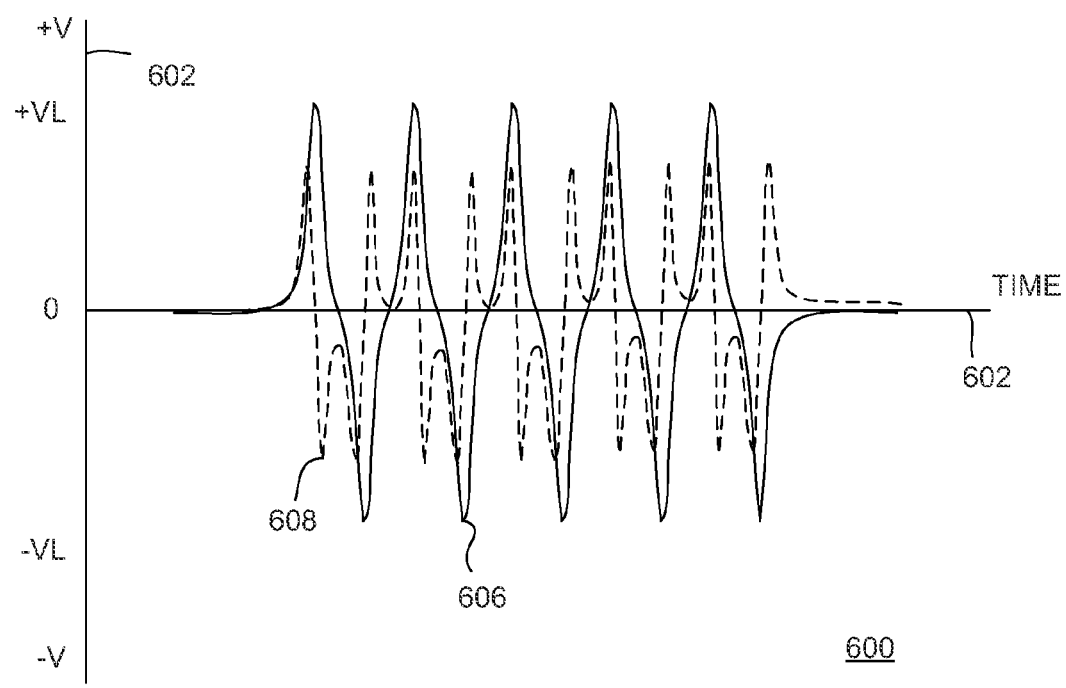
FIG. 6 is a graph illustrating normal and differentiated read-back signals according to an example implementation.

FIG. 6 is a graph 600 illustrating normal and differentiated read-back signals according to an example implementation. The graph 600 includes an axis 602 representing voltage, and an axis 604 representing time. A plot 606 (solid line) shows a normal read-back signal with both positive and negative voltage peaks. A plot 608 (dashed line) shows the derivative of the normal read-back signal (derivative signal). The graph 600 is not drawn to any particular scale. The derivative signal 608 crosses zero at the peaks of the normal read-back signal 606. The derivative signal 608 also approaches zero at the inflection points of the normal read-back signal 606.

Figure 7:
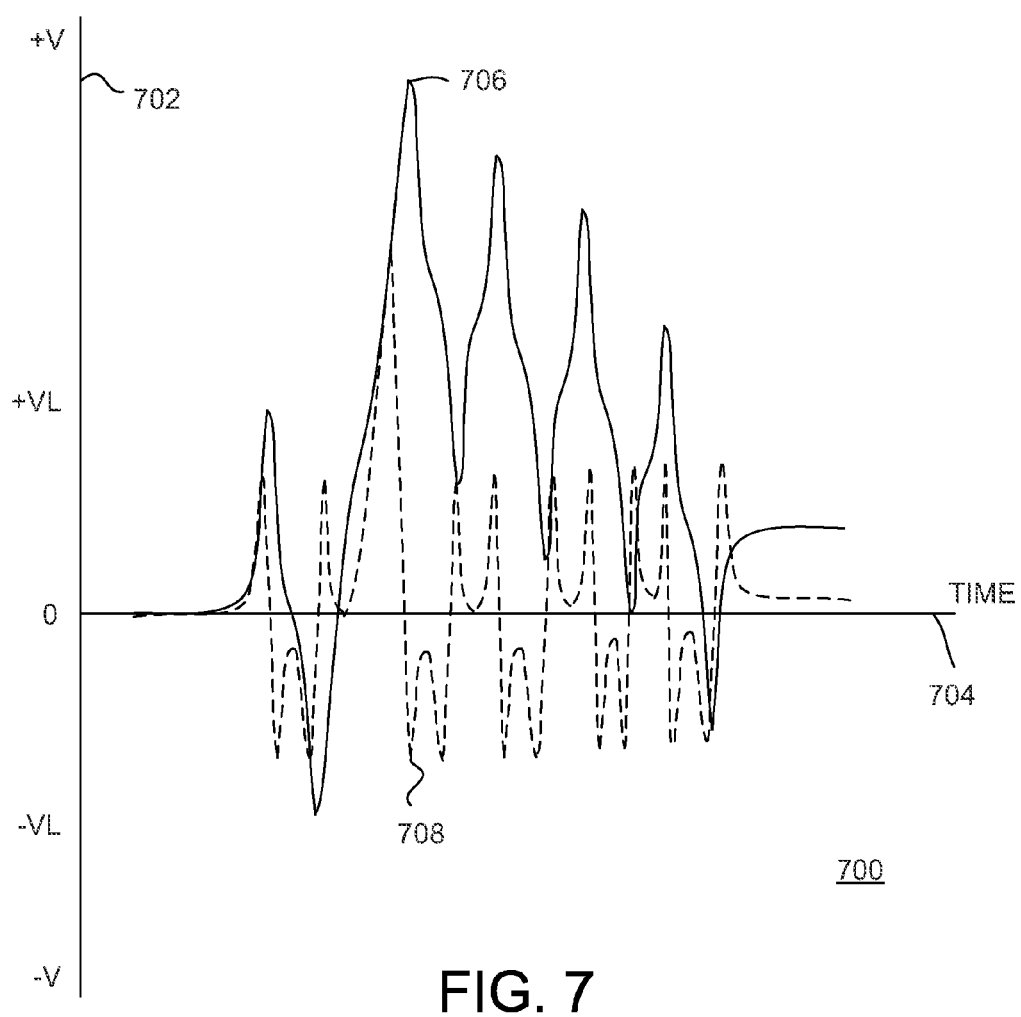
FIG. 7 is a graph illustrating noisy and differentiated read-back signals according to an example implementation.

FIG. 7 is a graph 700 illustrating noisy and differentiated read-back signals according to an example implementation. The graph 700 includes an axis 702 representing voltage, and an axis 704 representing time. A plot 706 (solid line) shows a noisy read-back signal, and a plot 708 (dashed line) shows the derivative of the noisy read-back signal. The noisy read-back signal 706 includes a baseline disturbance that decays over time, causing a large amplitude peak, followed by lower and lower amplitude peaks over time. The derivative signal 708 includes one large peak corresponding to the largest peak in the noisy read-back signal 706, followed by normal peaks similar to the derivative signal 608 in FIG. 6. The large peak in the derivative signal 708 is due to the large rate-of-change of the noisy read-back signal upon first encountering the noise. After the initial spike due to noise, the rates-of-change of the noisy read-back signal 706 return to normal (similar to the normal read-back signal 606 in FIG. 6).

Assume the ADC 210 includes a range of +/−VL, as shown in FIGS. 6 and 7. The noisy read-back signal 706 exceeds the range of the ADC 210 after the baseline disturbance occurs. If the noisy read-back signal were sampled by the ADC 210, the ADC 210 would clip the portions of the signal that exceed the range, resulting in reduced resolution and the lost of peak information. Since the time-stamps of the peaks encode the position information, the position information would not be accurately obtained. The derivative signal 708, however, only includes one peak that exceeds the range of the ADC 210. However, the important parts of the derivative signal occur at the zero-crossings, which correspond to the peaks of the read-back signal. All of the points around the zero-crossings of the derivative signal fit within the range of the ADC 210, and thus accurate time-stamps can be obtained for the peaks of the read-back signal.

Figure 8:
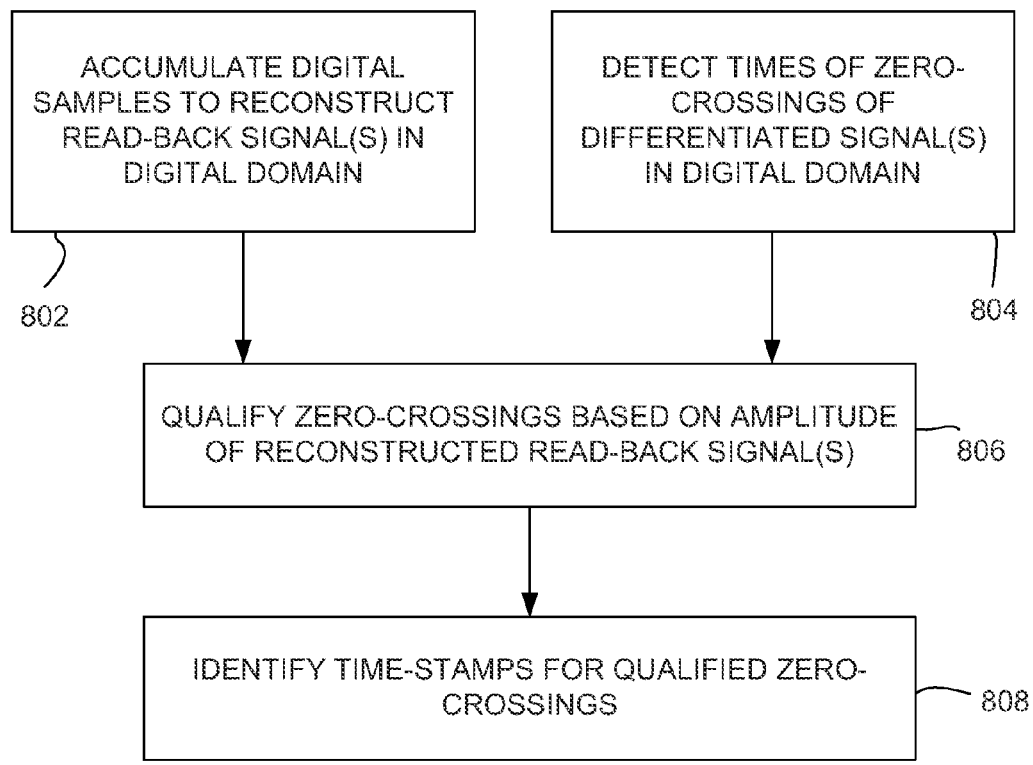
FIG. 8 is a block diagram depicting a method of processing derivative(s) of read-back signal(s) in the digital domain according to an example implementation.

FIG. 8 is a block diagram depicting a method 800 of processing derivative(s) of read-back signal(s) in the digital domain according to an example implementation. The method 800 can be performed by the DSP 212 shown in FIG. 2. The method 800 begins at step 802, where digital samples are accumulated to reconstruct the read-back signal(s) in the digital domain. In an example, the digital samples can be integrated to recover the read-back signal(s) from the derivative signal(s). In another example, the digital samples can be filtered using a low pass filter. For example, the following algorithm can be implemented:

$LPo\_p = LPo$ $LPo = LPo\_p * K1\_LP + (HPo + HPo\_P) * K2\_LP$

Where HPo is a differentiated read-back signal sample; HPo_p is the previous sample to HPo; LPo is the reconstructed read-back signal sample; LPo_p is a previously reconstructed read-back signal sample; and K1_LP/K2_LP are the low pass filter coefficients.

At step 804, times of zero-crossings of the derivative signal(s) are detected in the digital domain. In an example, the times of zero-crossings can be determined using linear interpolation of the near-zero digital samples. A linearly interpolated time-stamp can be calculated as follows:

$Txing = Tsamp - HPo * (Tsamp - Tsamp\_p) / (HPo - HPo\_p)$

Where HPo is a differentiated read-back signal sample; HPo_p is the previous sample to HPo; Tsamp−Tsamp_p is the time difference between the samples, and Txing is the time-stamp.

At step 806, the zero-crossings are qualified based on the amplitude of the reconstructed read-back signal(s). As shown in FIGS. 6 and 7, the derivative signal crosses zero at the peaks of the read-back signal, as well as at inflection points in-between the peaks. To obtain the position information, only the time-stamps of the peaks are important, and not the time-stamps of any inflection points. In order to discard times of zero-crossings not associated with peaks in the read-back signal(s), the amplitude of the reconstructed read-back signal(s) can be used as a filter. For example, consider an amplitude threshold T. If at a zero-crossing the amplitude of an associated reconstructed read-back signal is above T, then the time-stamp of the zero-crossing qualifies. Otherwise, the time-stamp is discarded.

At step 808, the time-stamps of the qualified zero-crossings are identified. As described above, position information can be derived from the time-stamps for a servo reader relative to a servo pattern.

Servo pattern read-back signal processing for storage devices has been described. In an example, read-back signal(s) derived from servo patterns is/are differentiated in the analog domain. The pre-conditioning in the analog domain is tailored for signal characteristics and processing required for timing-based position signal demodulation. Direct analog-to-digital conversion of the read-back signal(s) suffers from over-range problems at the ADC, in particular around the signal peaks, which can be affected by a large baseline disturbance due to noise. Since the location of the peaks of the read-back signal(s) contain the key information of the servo pattern(s), clipping or altering the signal peaks results in incorrect data being detected. The differentiated read-back signal(s) is/are less likely to over-range at the ADC. Moreover, the critical points of the differentiated signal(s) are at the zero-crossings, rather than at the peaks.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of processing a read-back signal derived from a servo pattern on a storage medium in a storage device, comprising:
    differentiating the read-back signal in an analog domain to produce a differentiated signal;
    converting the differentiated signal into digital samples;
    accumulating the digital samples to produce a digitized representation of the read-back signal;
    detecting times of zero-crossings of the differentiated signal from the digital samples;
    qualifying at least a portion of the zero-crossings based on amplitude of the digitized representation of the read-back signal to produce qualified zero-crossings; and
    identifying time-stamps for the qualified zero-crossings.

2. The method of claim 1, wherein the processing of the digital samples further comprises:
    demodulating the time-stamps to derive position information for a servo reader of the storage device relative to the servo pattern.

3. The method of claim 1, wherein the step of detecting the zero-crossings comprises:
    determining linear interpolations of near-zero digital samples to identify the zero-crossings.

4. The method of claim 1, wherein the step of accumulating comprises:
    filtering the digital samples using a low-pass filter.

5. The method of claim 1, further comprising:
    processing the digital samples in a digital domain to obtain position information for a servo reader of the storage device relative to the servo pattern.

6. An apparatus to process a read-back signal derived from a servo pattern on a storage medium in a storage device, comprising:
    a differentiator to receive the read-back signal and to produce a differentiated signal;
    an analog-to-digital converter (ADC), coupled to the differentiator, to convert the differentiated signal into digital samples; and
    a digital signal processor, coupled to the ADC, to process the digital samples to identify time-stamps of peaks in amplitude of the read-back signal.

7. The apparatus of claim 6, wherein the digital signal processor accumulates the digital samples to produce a re-construction of the read-back signal, detects times of zero-crossings of the differentiated signal, and determines the time-stamps from qualified ones of the zero-crossings based on amplitude of the re-constructed read-back signal.

8. The apparatus of claim 7, wherein the digital signal processor implements linear interpolation of near-zero digital samples to determine the zero-crossings of the differentiated signal.

9. The apparatus of claim 7, wherein the digital signal processor implements a low pass filter to produce the re-constructed read-back signal.

10. The apparatus of claim 6, wherein the digital signal processor demodulates the time-stamps to determine position information for a servo reader of the storage device relative to the servo pattern.

11. A storage device, comprising:
    a head having a servo reader to generate a read-back signal from a servo pattern on a storage medium;
    a differentiator, coupled to the servo reader, to produce a differentiated signal from the read-back signal;
    an analog-to-digital convertor (ADC), coupled to the differentiator, to convert the differentiated signal into digital samples;
    a digital signal processor, coupled to the ADC, to obtain position information for the servo reader relative to the servo pattern from the digital samples;
    wherein the digital signal processor accumulates the digital samples to produce a re-construction of the read-back signal, detects times of zero-crossings of the differentiated signal, and determines time-stamps of qualified ones of the zero-crossings based on amplitude of the re-constructed read-back signal.

12. The storage device of claim 11, wherein the digital signal processor implements linear interpolation of near-zero digital samples to determine the zero-crossings of the differentiated signal, and a low pass filter to produce the re-constructed read-back signal.

* * * * *